Nov. 20, 1928.

L. B. CLIFFORD 1,692,795

PUMP VALVE

Filed Jan. 7, 1927

INVENTOR
L. B. Clifford,
BY
Munn & Co.
ATTORNEYS

Patented Nov. 20, 1928.

1,692,795

UNITED STATES PATENT OFFICE.

LESLIE B. CLIFFORD, OF TEXARKANA, ARKANSAS.

PUMP VALVE.

Application filed January 7, 1927. Serial No. 159,650.

This invention relates to valves and valve seats for pumps, and has for its object the provision of a valve having a guide upon its opposite faces for maintaining the valve properly centered during operation so that said valve will be seated with the valve seat sheared off at an acute angle in order to prevent foreign matter collecting on the same.

A further object of the invention is the provision of a valve so constructed as to reduce the friction and side wear on the valve stem with a rubber composition valve secured on the stem against leakage with the valve stem having an upward hollow guide provided with passages for permitting the flow of liquid into and out of the hollow guide.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

Figure 1:
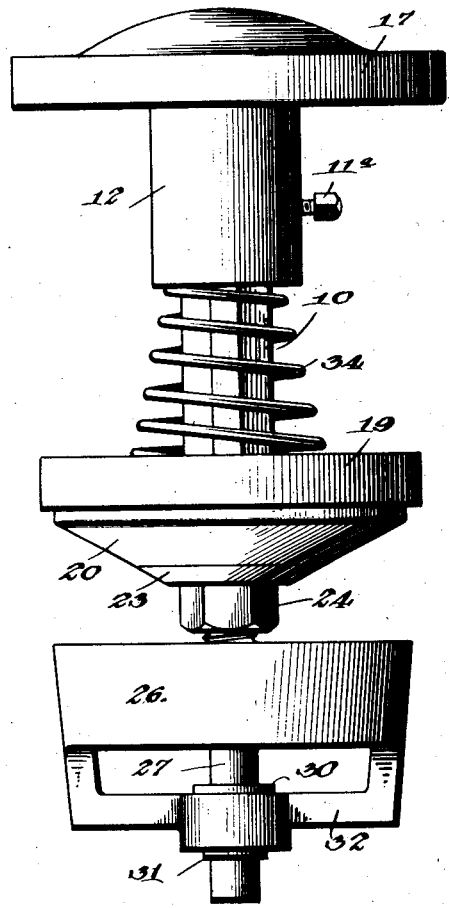
Figure 2:
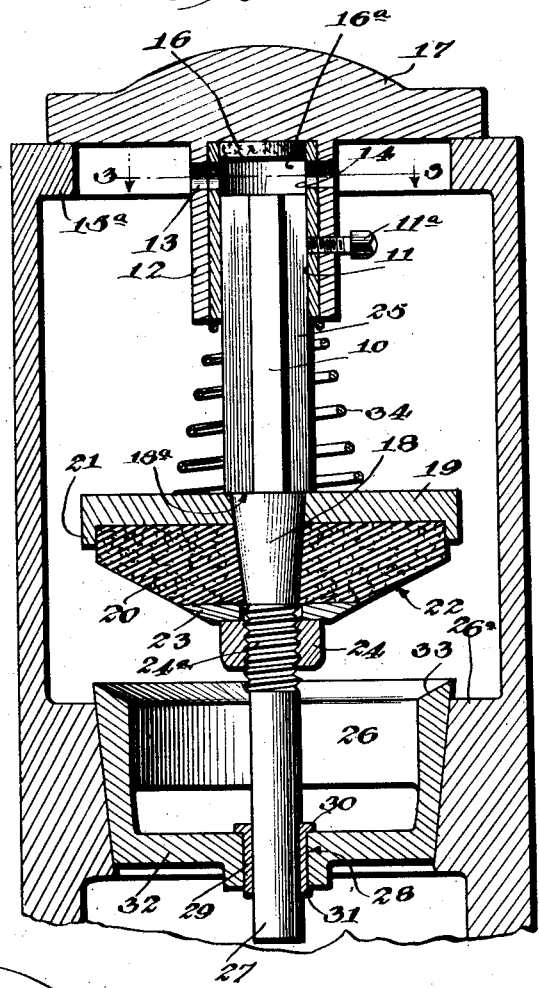
Figure 3:
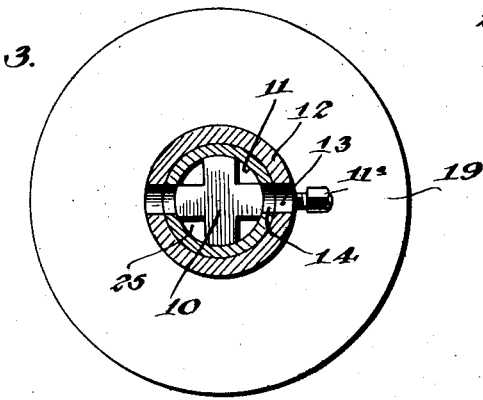

Figure 1 is a view in elevation of a valve constructed in accordance with the principles of my invention, Figure 2 is a similar view showing a vertical section of the device, and Figure 3 is a horizontal section taken along the line 3—3 of Figure 2.

Referring more particularly to the drawings 10 designates a valve stem movable in a bushing 11 carried by a hollow guide 12. The guide 12 has a pair of diametrically disposed passages 13 adapted to align with passages 14 in the bushing 11 in order to permit the passage of fluid through the hollow bushing 11 which is held in place by a set screw 11ª carried by the guide 12.

The upper end of the stem 10 is adapted to abut a composition disc 16 which prevents shocks to the stem. The guide 12 is cylindrical in shape and depends from a pump pot cover 17 resting on a flange 15ª at the top of the water chamber 15 of the pump.

A portion of the stem 10 is conically shaped, as shown at 18. A disc or cover 19 has a central perforation which is tapered to receive the tapered or conically shaped portion 18 of the stem and abuts a shoulder 18ª on said stem. A composition or rubber valve 20 is carried on the portion 18 of the stem and has its upper end received by the annular depending flange 21 of the cover 19. The side wall 22 of the valve 20 is cut at an angle about 25°. A washer 23 seated on the lower end of the valve 20 is secured in place by means of a lock nut 24 threaded on to the portion 24ª of the stem.

A cup-shaped member 26 seated in the beveled ring 26ª embraces the lower reduced end 27 of the stem and has a passage 28 in which is mounted a sleeve 29, the upper end of which is flanged, as shown at 30, while the lower end is swaged, as shown at 31, so that the sleeve will be prevented from loss from the passage 28 in the cup-shaped member 26. A bearing 31 which is carried by the arms 32 formed integrally with the cup-shaped member 26 is adapted to support the bushing or sleeve 29. The construction of the cup-shaped member through the arms 32 permits the free passage of liquid past the upper end of the cup-shaped member when the valve 20 is elevated therefrom.

The upper end of the cup-shaped member is sheared off to provide a valve seat 33 which is inclined at an angle which conforms to the inclination of the valve 20 so that the valve will be properly seated thereon. It will be noted that the bevelling of the valve seat 33 is such that foreign matter will not be able to collect thereon so that it will readily fall by gravity below the valve seat.

A spring 34 has its upper end in engagement with the lower end of the bushing or sleeve 11 while its lower end rests upon the cover 19. This valve is particularly useful for employment in slush pumps for drilling deep wells. The fact that the angle of inclination of the seat 33 is such that detritus will be readily dislodged therefrom provides for a rapid and tight fitting valve. Furthermore, the double guide means at opposite sides of the valve 20 also provides for a proper seating of the valve so that no leakage will occur.

The upper end of the stem 10 is provided with longitudinal grooves 25 to permit passage of fluid between the chamber 15 and a chamber 16ª in the bushing 11 above the stem 10.

I claim:—

A valve having a body construction comprising a valve formed of composition material, a metal cover in contact with the valve, a stem having a threaded portion for engagement with the valve body, the stem projecting upon opposite sides of the valve, a tubular guide at one side of the valve, a bushing received by the guide, said bushing and guide having aligned passages, one end of the stem being slidably mounted in said bushing, a cup-shaped member at the opposite side of the valve and provided with a valve seat, a guide carried by the cup-shaped member for the other end of the stem, said cup-shaped member being provided with openings for permitting the free passage of the water, the seat and valve being sheared off at an angle of 25° so that foreign matter will be prevented from collecting on the valve seat.

LESLIE B. CLIFFORD.